Aug. 8, 1961 N. T. WATTERS 2,995,624

SECRECY COMMUNICATION SYSTEM

Filed March 11, 1959 3 Sheets-Sheet 1

INVENTOR
Norman T. Watters
BY James E. Tracy
ATTORNEY

Aug. 8, 1961 N. T. WATTERS 2,995,624

SECRECY COMMUNICATION SYSTEM

Filed March 11, 1959 3 Sheets-Sheet 2

INVENTOR
Norman T. Watters

BY James E. Tracy

ATTORNEY

INVENTOR
Norman T. Watters
BY James E. Tracy
ATTORNEY 2,995,624

SECRECY COMMUNICATION SYSTEM

Norman T. Watters, Westchester, Ill., assignor to Zenith Radio Corporation, a corporation of Delaware Filed Mar. 11, 1959, Ser. No. 798,774
9 Claims. (Cl. 178—22)

This invention relates in general to secrecy communication systems and more particularly to subscription television systems in which a television signal, coded in accordance with a predetermined code schedule, is transmitted to subscriber receivers equipped with decoding apparatus actuated in accordance with the same code schedule. Since portions of the transmitter and receiver may be identical, the term "encoding" is used herein in its generic sense to encompass either coding at the transmitter or decoding at the receiver.

In copending patent application Serial No. 479,170, filed December 31, 1954, in the name of Erwin M. Roschke, assigned to the assignee of the present application, a system is described wherein a 20:1 multi-step cycling mechanism, including a counting chain of a 5:1 blocking oscillator and two bi-stable multivibrators, responds in cyclic fashion to applied line-drive pulses to develop a periodically recurring square-wave shaped control signal that is employed to periodically delay the video information with respect to the synchronizing information at a rate faster than the field-scanning frequency to effect coding. This in itself results in a picture display at an unauthorized receiver in which portions of the picture, or horizontal strips, "jitter" back and forth with respect to each other at a corresponding faster-than-field rates.

In order to introduce additional scrambling, the cyclic actuation of the counting mechanism may be interrupted or arrested from time to time, specifically during portions of the field-retrace intervals, to effectively phase modulate the square wave about a mean frequency determined by the 20:1 counting ratio. Such interruptions may be realized by developing during each of those field-retrace intervals a combination of randomly sequenced code signal bursts or components, individually having a predetermined one of six different identifying frequencies $f_1$–$f_6$. These bursts are applied to various input circuits of an adjustable permutation or switching mechanism containing a family of switches or switching elements wherein the bursts are routed or channeled, in accordance with one of a multiplicity of possible permutation patterns as established by the adjustment of the switching mechanism. Output terminals of the permutation mechanism lead to the input terminals of a series of gate circuits, serving to gate in selected line-drive pulses to the input circuits of the bi-stable multivibrators included in the cycling mechanism. In this fashion, the counter may be actuated during field retrace and assume a particular one of its several phase conditions as determined by the occurrence of the code signal bursts and the adjustment of the permutation mechanism, as more fully explained in the Roschke application.

A "gated reset" feature is also disclosed in the Roschke application. Specifically, a normally-closed gate circuit receives, through the permutation switching mechanism, code signal bursts of a particular one of the burst frequencies $f_1$–$f_6$, as determined by the particular setting of the switching mechanism. The control signal derived from the cycling mechanism is utilized as a gating signal to control the gate. When the gate is established in its open or translating condition, the received code signal bursts, corresponding in frequency to the frequency assigned to resetting, are utilized to reset the 5:1 blocking oscillator to its reference or zero-count condition.

Each subscriber receiver contains circuitry identical to that which is discussed above and which is located at the transmitter and unless that mechanism is adjusted or set up in the manner prescribed for each individual program, the correct channeling of the code signal bursts to the bi-stable multivibrators and to the reset for the blocking oscillator will not be effected and decoding will not be obtained.

As further explained in the Roschke application, the immunization of the system against unauthorized pirating of a subscription telecast is considerably greater than that enjoyed by similar prior arrangements. In the previous systems of the type employing cyclically actuated counting mechanisms whose periodic sequence of operation is interrupted or arrested from time to time as determined by code components translated through a switching or permuting mechanism, if all of the various switching elements making up the permuter are incorrectly positioned, a completely scrambled and distorted picture results. However, it may be remotely possible in occasional and rare instances for an unauthorized person, not apprised of the required setting for a particular program, through the employment of a trial and error method of manipulating the switching elements to partially unscramble the picture as some of the switching elements are positioned to their respective correct settings. He may then concentrate his efforts on the elements not properly set up and as each one is correctly positioned, it may be possible to detect and guide the approach to the correct setting through the observation and evaluation of subtle visual clues in the form of progressive minor improvements in certain critical details of image reproduction. The Roschke arrangement precludes or minimizes partial decoding even if some, but not all, of the switching elements are properly set up. In other words, if an unauthorized person bent on fraud attempts to reach the proper combination or pattern by trial and error methods, considerably fewer and even more subtle visual clues will be revealed on the receiver screen as the correct combination is approached, thus virtually eliminating any possibility of unauthorized appropriation of the coded telecast.

As also explained in the copending Roschke application, Serial No. 479,170, in previous similar systems the counting mechanism employed may possibly be actuated by noise or other extraneous signals, resulting in non-synchronous operation between the transmitting and receiving equipment. This has been remedied in the past by translating reset pulses. from time to time, directly to each of the various counting stages to restore them to reference operating conditions. By employing the gated reset feature of the Roschke arrangement, a considerable improvement is achieved in that it is no longer necessary to provide either separate reset circuitry for the several counting stages or to restrict the utilization of code combinations to those including predetermined reset pulses destined for triggering the counting mechanism to reference operating conditions.

The system of the present application constitutes an improvement over the Roschke arrangement in that substantially the same results are achieved except with even less expensive circuitry.

It is, accordingly, an object of the present invention to improve the secrecy communication system taught by the Roschke application, Serial No. 479,170.

It is another object of the invention to provide a new and improved subscription television system in which a television signal is coded with a high degree of complexity.

It is another object of the invention to provide an improved subscription television system employing an air-borne coding signal wherein encoding is achieved in such a manner that unauthorized decoding is virtually eliminated.

A secrecy communication system, constructed in accordance with one aspect of the present invention, comprises an encoding device actuable to vary the operating mode of the system. A multi-step cycling mechanism is coupled to the encoding device and responds to a series of applied pulses for advancing from one step to the next in a predetermined periodic repeating sequence to effect actuation of the encoding device. There are means for applying a series of drive pulses to the mechanism. Means are coupled to the cycling mechanism for altering the predetermined sequence of operating steps from time to time in accordance with a secret code schedule. Finally, the system includes a feedback circuit coupled from the output of the cycling mechanism to a portion of the cycling mechanism for resetting at least the portion to a predetermined reference condition each time the mechanism advances to a predetermined one of its operating steps.

The features of this invention which are believed to be new are set forth with particularity in the appended claims. The invention, together with further objects and advantages thereof, may best be understood, however, by reference to the following description in conjunction with the accompanying drawings, in which identical reference numerals indicate identical elements, and in which:

Figure 1:
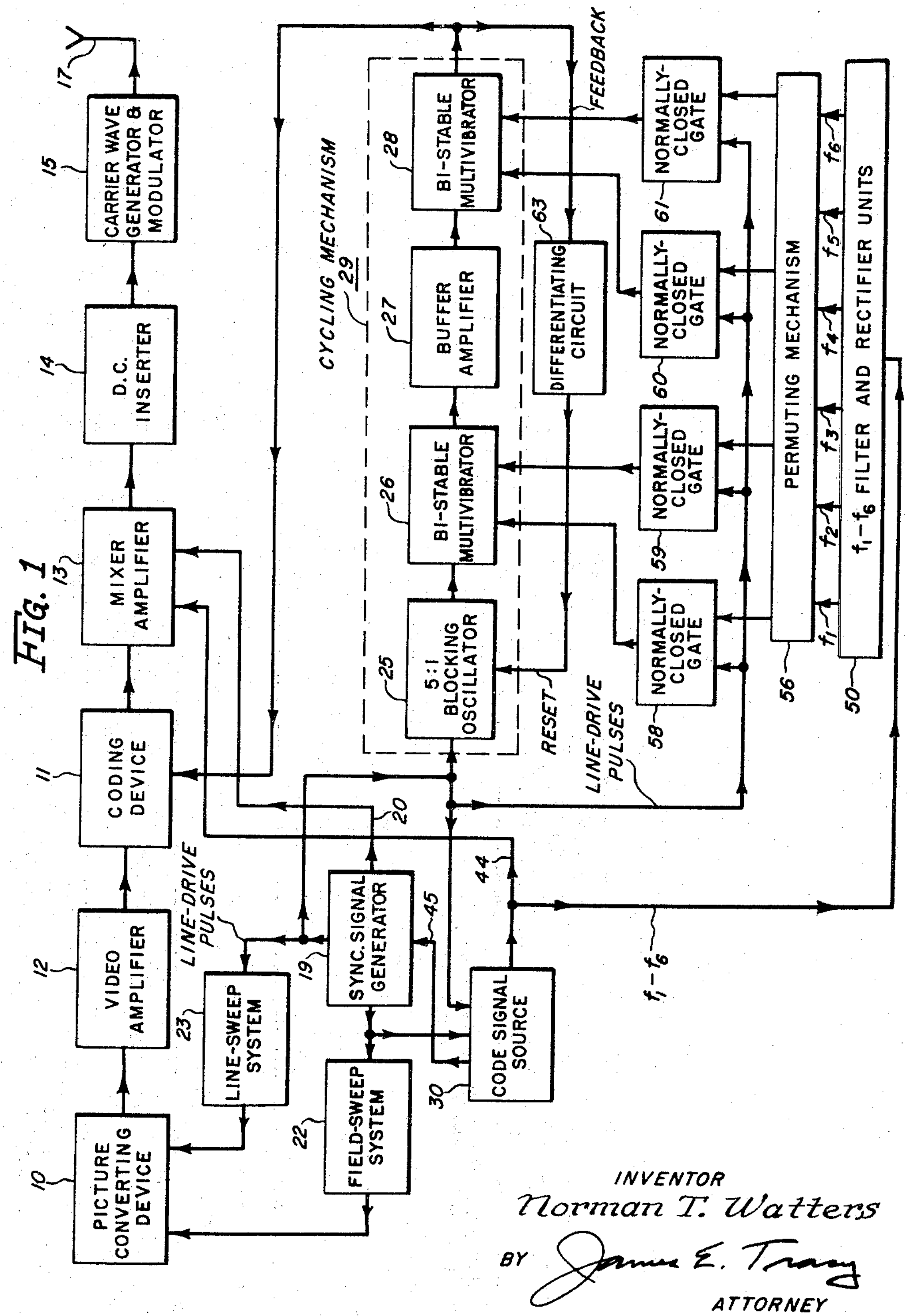
FIGURE 1 is a block diagram of a subscription television transmitter constructed in accordance with one embodiment of the invention.

Before turning to a description of the structure of FIGURE 1, it should be stated that many of the circuits shown in block diagram are illustrated in greater detail in the aforementioned Roschke application, Serial No. 479,170. The expedient of block diagram illustration has been employed in the interest of simplification.

Considering now the structural composition of the transmitter of FIGURE 1, a picture converting device 10 is provided which may take the form of a conventional camera tube for developing a video signal representing an image to be televised. An encoding device or coder 11 is coupled to the output terminals of device 10 through a video amplifier 12. This coder may be similar to that disclosed and claimed in Patent 2,758,153, issued August 7, 1956, to Robert Adler, and assigned to the present assignee. More particularly, it may comprise a beam-deflection switch tube having a pair of collector anodes connected respectively to a pair of output circuits which may be selectively interposed in the video channel as the electron beam of the tube is deflected from one to the other of the two anodes. A delay line is included in one of the output circuits so that when the beam is incident on the associated collector anode, a time delay is introduced to the video components relative to the synchronizing components of the radiated television signal. Switching of the beam is accomplished in accordance with a secret code schedule by means of a beam deflection-control or actuating signal applied to deflection electrodes of coder 11. Of course, intermittently varying the relative timing of the video and the synchronizing signals effectively codes or scrambles the television signal since ordinary television receivers, not containing suitable decoding apparatus, require a television signal wherein there is a constant time relation between its video and synchronizing components. If such is not the case, intelligible reproduction is impossible.

The output circuit of coder 11 is coupled to one pair of input terminals of a mixer amplifier 13, which in turn is connected through a direct-current inserter 14 to a carrier wave generator and modulator 15 having its output terminals connected to an antenna 17. A synchronizing-signal generator 19 supplies the usual field- and line-synchronizing components and associated pedestal components to mixer amplifier 13 over suitable circuit connections, here schematically illustrated as a single conductor 20. Generator 19 further supplies field- and line-drive pulses to a field-sweep system 22 and to a line-sweep system 23, respectively. The output terminals of sweep systems 22 and 23 are connected to the field- and line-deflection elements (not shown) associated with picture converting device 10.

Synchronizing-signal generator 19 additionally supplies line-drive pulses to one input of a conventional 5:1 step-down blocking oscillator 25 which has its output terminals connected to the "common" or "counting" input circuit of a conventional bi-stable multivibrator 26. This multivibrator may consist of the usual pair of cross-coupled triodes or transistors rendered conductive in alternation as the multivibrator is triggered between its two stable operating conditions. Blocking oscillator 25 is coupled to both of the triodes or transistors, whichever the case may be, by way of the common or counting input so that the multivibrator is always triggered from its instantaneous condition, whatever one that may be, to its opposite condition in response to successive applied pulses from the oscillator. Multivibrator 26 is coupled through a buffer amplifier 27 to another bi-stable multivibrator 28 which has its output terminals connected to the deflection electrodes of coder 11. The output of amplifier 27 is connected to multivibrator 28 in a fashion similar to the connection of oscillator 25 to multivibrator 26 so that multivibrator 28 is always actuated from one to the other of its two stable operating conditions in response to successive pulses from amplifier 27. Since the cascade arrangement of blocking oscillator 25 and multivibrators 26 and 28 realizes a total count-down ratio of 20:1, the output or control signal from multivibrator 28 exhibits a rectangular or square wave shape having amplitude changes every ten line traces. This effects actuation of coder 11 between its two operating conditions and interposes the time delay network in the video channel during alternate groups of ten successive line trace intervals to introduce a time delay between the radiated video and the synchronizing components.

Each of units 25, 26 and 28 constitute a multi-condition counting device or stage and they collectively have a sequence of twenty operating steps. The chain of counting stages thus constitutes a cycling mechanism as indicated by reference numeral 29.

Generator 19 also supplies field-drive pulses to one input circuit of a code signal source or generator 30 and line-drive pulses to another input circuit of generator 30. Source 30 is provided to develop during a portion of each field-retrace interval a combination of code signal components or bursts individually having a predetermined identifying characteristic, such as frequency, and collectively representing coding information in accordance with their appearance and order within the combination. A suitable code signal source is fully disclosed and claimed in copending application Serial No. 463,702, filed October 21, 1954, and issued August 2, 1960, as Patent 2,947,804, in the name of Carl G. Eilers et al., and assigned to the assignee of the present application; thus, source 30 is shown only in block diagram representation to avoid unduly encumbering the description and drawing.

In the illustrated embodiment of the present invention, and as is described in detail in copending application Serial No. 463,702, the code signal generated during each field-retrace interval may comprise a series of up to six bursts, each of which may be of any of six various signal frequencies $f_1$–$f_6$, inclusive, preferably randomly sequenced and randomly appearing within the overall code-burst interval. These bursts or code signal components are individually produced between successive line-drive pulses and are superimposed on the vertical blanking pedestal. To achieve such superimposition, code signal source 30 is connected to generator 19 via conductor 45. The output terminals of source 30 are connected over conductor 44 to another input of mixer 13 and also to a series of six filter and rectifier units, conveniently shown in FIGURE 1 by a single block 50, respectively selective to assigned ones of the different frequencies $f_1$–$f_6$ to facilitate separation of the code signal components from one another. The six outputs of the filter and rectifier units, each of which produces rectified pulses of one of frequencies $f_1$–$f_6$ as indicated in the drawing, are connected to a series of six input circuits of a permuting mechanism 56 having a series of four output circuits. The input and output circuits of mechanism 56 may be considered code-determining circuits between which mechanism 56 establishes different prescribed ones of a multiplicity of different interconnection patterns. This may be achieved by a family of switches, the adjustment of which selects the desired permutation pattern between inputs and outputs for a given program interval. Suitable permutation switching mechanisms for unit 56 that provide adequate degrees of security against unauthorized deciphering are disclosed, for example, in copending applications Serial No. 407,192, filed February 1, 1954, and issued December 30, 1958, as Patent 2,866,961, in the name of George V. Morris; Serial No. 490,078, filed February 23, 1955, in the name of George V. Morris et al.; and Serial No. 555,541, filed December 27, 1955, and issued September 8, 1959, as Patent 2,903,686, in the name of Jack E. Bridges, all of which are assigned to the present assignee.

Permutation mechanism 56 is provided to permute applied code signal components between its input and output circuits in order that the code bursts developed in source 30 may be further coded before they are used for coding the program signal. It is contemplated that this switching arrangement will be adjusted differently for each different program for which a charge is to be assessed and that the permuting mechanism installed at each receiver within a given service area will require a different setting for any selected program, in order that each subscriber must obtain different switch setting data for each program.

The four output circuits of permuting mechanism 56 are connected to respective ones of a series of four normally-closed gate circuits 58–61 which are supplied with line-drive pulses from synchronizing-signal generator 19. The output circuits of gates 58 and 59 are connected to input circuits of bi-stable multivibrator 26 and the output circuits of gates 60 and 61 are connected to input circuits of bi-stable multivibrator 28. Gates 58 and 60 are preferably coupled to the counting or common inputs of multivibrators 26 and 28, respectively, so that each time a pulse is translated through one of those gates, the associated multivibrator is triggered from its instantaneous condition, whichever one that may be, to its opposite condition in the same manner as if it has been supplied with a pulse from blocking oscillator 25, in the case of multivibrator 26, or from buffer amplifier 27 in the case of multivibrator 28. On the other hand, the connections from gates 59 and 61 are preferably connected to "reset" inputs of multivibrators 26 and 28, respectively, that actuate the multivibrators to predetermined ones of their two operating conditions. If either of the multivibrators is already in that condition when a pulse is supplied thereto from its associated one of gates 59, 61, there will be no actuation and the pulse will be ineffective.

The circuitry described thus far is essentially identical to that illustrated in considerable detail in the copending Roschke application, Serial No. 479,170. As briefly mentioned hereinbefore, in the Roschke system a blocking oscillator like 25 is reset to its reference or zero-count operating step by means of one of the code bursts selected by a permuting mechanism corresponding to 56 and translated to its reset input via a normally-closed gate circuit. A gating signal for determining the translating condition of the gate is derived from a bi-stable multivibrator like 28 and thus whether or not the code components applied to the gate are, in fact, utilized for resetting is determined by the instantaneous condition of the multivibrator corresponding to 28. In accordance with the present invention, essentially the same results achieved by the gated reset feature of the Roschke system are obtained simply by providing a feedback circuit, including a differentiating circuit 63, from one portion to another portion of cycling mechanism 29 for resetting such other portion thereof to a predetermined reference condition each time the mechanism advances to a predetermined one of its operating steps. As specifically shown, the feedback circuit is connected from the output of multivibrator 28 to the reset input of blocking oscillator 25. The control signal from multivibrator 28 exhibits an amplitude characteristic that varies between two control conditions or levels and determines when oscillator 25 is reset.

Considering now the operation of the transmitter, picture converting device 10 develops a video signal representing the picture or image information to be televised and after amplification in amplifier 12 the video signal is translated through coder 11 to mixer amplifier 13 wherein it is combined with the customary field- and line-synchronizing and blanking pulses from synchronizing-signal generator 19. Mixer 13 thereby develops a composite video signal which is applied through direct-current inserter 14 to unit 15 wherein it is amplitude modulated on a picture carrier for transmission to subscriber receivers via antenna 17. Sweep systems 22 and 23 are synchronized by the field- and line-drive pulses from generator 19 in conventional manner.

Coding of the video portion of the telecast is achieved by coder 11 under the influence of a deflection-control signal developed from line-drive pulses by cycling mechanism 29 for periodically switching the beam of the beam-deflection tube in coder 11 back and forth between its two collector anodes in accordance with the pattern represented by the amplitude variations of the control signal, which occur every ten line traces because of the 20:1 ratio of counting stages 25, 26 and 28. This actuation of encoding device 11 varies the operating mode of the transmitter after every group of ten successive line-trace intervals by modifying the time relation between the video and synchronizing components of the radiated signal and provides effective picture scrambling or coding.

In order to interrupt this periodic mode-changing pattern and increase the complexity of the coding schedule, a combination of code signal components or bursts individually exhibiting one of frequencies $f_1$–$f_6$ is developed in source 30 during a portion of each field-retrace interval. The bursts are separated from one another and rectified in filter and rectifier units 50 for individual application to the various input circuits or permuting mechanism 56. This mechanism may establish any one of a multitude of circuit connections between its input and output circuits so that the rectified pulses are supplied to normally-closed gate circuits 58–61 with a distribution depending on the instantaneous setting of mechanism 56. In this way, the code signal components of frequencies $f_1$–$f_6$ are effectively permuted. Gates 58–61 also receive line-drive pulses from generator 19 and gate in those of the line-drive pulses that occur in time coincidence with the rectified code bursts to the various input circuits of multivibrators 26 and 28. Since the code components are preferably randomly sequenced, the cyclic actuation of the multivibrators normally taking place in response to pulses from oscillator 25 only is interrupted or disrupted so that upon the termination of each combination of code bursts the counting or cycling mechanism is established at a different operating step or phase condition from that in which it would be established if the periodic actuation had not been interrupted. The control signal developed in the output of multivibrator 28 thus constitutes a rectangular or square wave shaped signal which is phase modulated during field-retrace intervals as between a plurality of possible phase conditions.

In order to add additional scrambling to the system in accordance with the present invention, the rectangular shaped control signal from multivibrator 28 is differentiated in differentiating circuit 63 and the differentiated pulses are applied to oscillator 25 for resetting purposes. Depending on the particular point in the circuit of oscillator 25 at which the reset pulses are applied, determines whether reset is accomplished in response to the positive or negative going amplitude excursions of the control signal from multivibrator 28. If, for example, unit 25 is arranged so that resetting is only accomplished in response to positive pulses or spikes, then the pulses developed in differentiator circuit 63 are of correct polarity only in response to positive-going amplitude excursions of the square wave, the negative spikes developed in differentiator 63 from the negative going excursions of the control signal having no effect.

In order to produce a reset pulse for oscillator 25, it is necessary for at least one of multivibrators 26 and 28 to have triggered from one condition to the other. Thus, for stability reasons a reset pulse should not effect retriggering of the multivibrator which initiated the production of the pulse in the first place. To this end, circuits 26 and 28 are preferably so designed, with respect to resolution time, that successive applied triggering pulses must have a minimum time separation; otherwise it is possible that resetting oscillator 25 may result in immediate actuation of multivibrators 26 and 28.

It is appreciated that at the beginning of a subscription telecast the multivibrators at each receiver corresponding to 26 and 28 may not be established in the same operating conditions in which the transmitter multivibrators are placed. Moreover, even if the receiver multivibrators are initially in step with those at the transmitter it is possible that they may fall out of step during the telecast due to the effect of noise or some other unwanted signal. As fully described in the copending Roschke application, Serial No. 479,170, resetting of the multivibrators is not required when gated reset pulses are employed to reset the blocking oscillator. This very desirable result or advantage is also present in the instant system. This obtains since at times the receiver multivibrator corresponding to multivibrator 28 either effects the translation of a reset pulse to the blocking oscillator corresponding to 25 when it should not, namely when a corresponding pulse is not translated at the transmitter, or does not translate a pulse when it should do so, all due to the fact that either one of the counting stages is out of step or phase at the receiver. However, when this does happen, the operation or non-operation of the corresponding blocking oscillator at some time or other effectively places the corresponding multivibrators in the same operating condition or state as multivibrators 26 and 28 at the transmitter. When this occurs, the receiver falls into step with the transmitter and will remain there. Such automatic resetting takes place even through all of the pulses in the code combinations may be channeled to the common input circuits. It is apparent that this feature permits a much wider latitude in the selection of code signal combinations since it is not necessary to include pulses within each combination that effect triggering of the multivibrators to reference operating conditions.

By way of summary, the transmitter of FIGURE 1 has an encoding device 11 which is actuable to vary the operating mode of the system. Cycling mechanism 29 effects actuation of encoding device 11 and this mechanism comprises a plurality of cascade- connected counting stages 25, 26, 28 collectively constituting a counting chain. Generator 19 constitutes means coupled to the first of the stages (namely oscillator 25) in the chain for cyclically operating the chain through a sequence of steps (specifically twenty steps) to effect actuation of cycling mechanism 29 in a predetermined periodic repeating sequence. Units 30, and 50—61 constitute means coupled to one of the stages subsequent to the first stage for interrupting the periodic sequence from time to time (namely during field-retrace intervals) in accordance with a secret code schedule. Differentiating circuit 63 and the coupling circuitry from the output of multivibrator 28 to the reset input of oscillator 25 constitute a feedback circuit coupled from the last of the stages to the first stage for resetting the first stage to a predetermined reference condition each time the counting chain advances to a predetermined one of its operating steps.

Viewed differently, units 30 and 50—61 constitute means for disrupting the cyclic operation of at least one of the counting stages or devices; for example, counting device 26 is so disrupted. The feedback circuit including differentiator 63 is coupled from one to another portion of the cycling mechanism for disrupting the cyclic operation of at least one other one of the counting devices (namely counting device 25) each time the cycling mechanism advances to a predetermined one of its operating steps.

In order that a subscriber may utilize the coded transmission, it is necessary that each combination of code signal components be made known to the subscriber receivers. To that end, the code bursts of frequencies $f_1$–$f_6$ are applied to mixer amplifier 13 over conductor 44 to be combined with the composite video signal for transmission to the subscriber receivers. The signal bursts of various frequencies individually occur between successive line-drive pulses superimposed on the vertical or field-retrace blanking pedestals, and in order not to disturb the sweep systems of the subscriber receivers it is desired that the amplitude level of the blanking pulse be modified to effect an inward modulation by the code signal components. This is achieved by applying pulses to synchronizing-signal generator 19 from source 30 over conductor 45 to produce suitable modulating pulses which, in turn, are applied to mixer amplifier 13 by way of conductor 20 to downward modulate the vertical banking pulse at the appropriate times.

Figure 2:
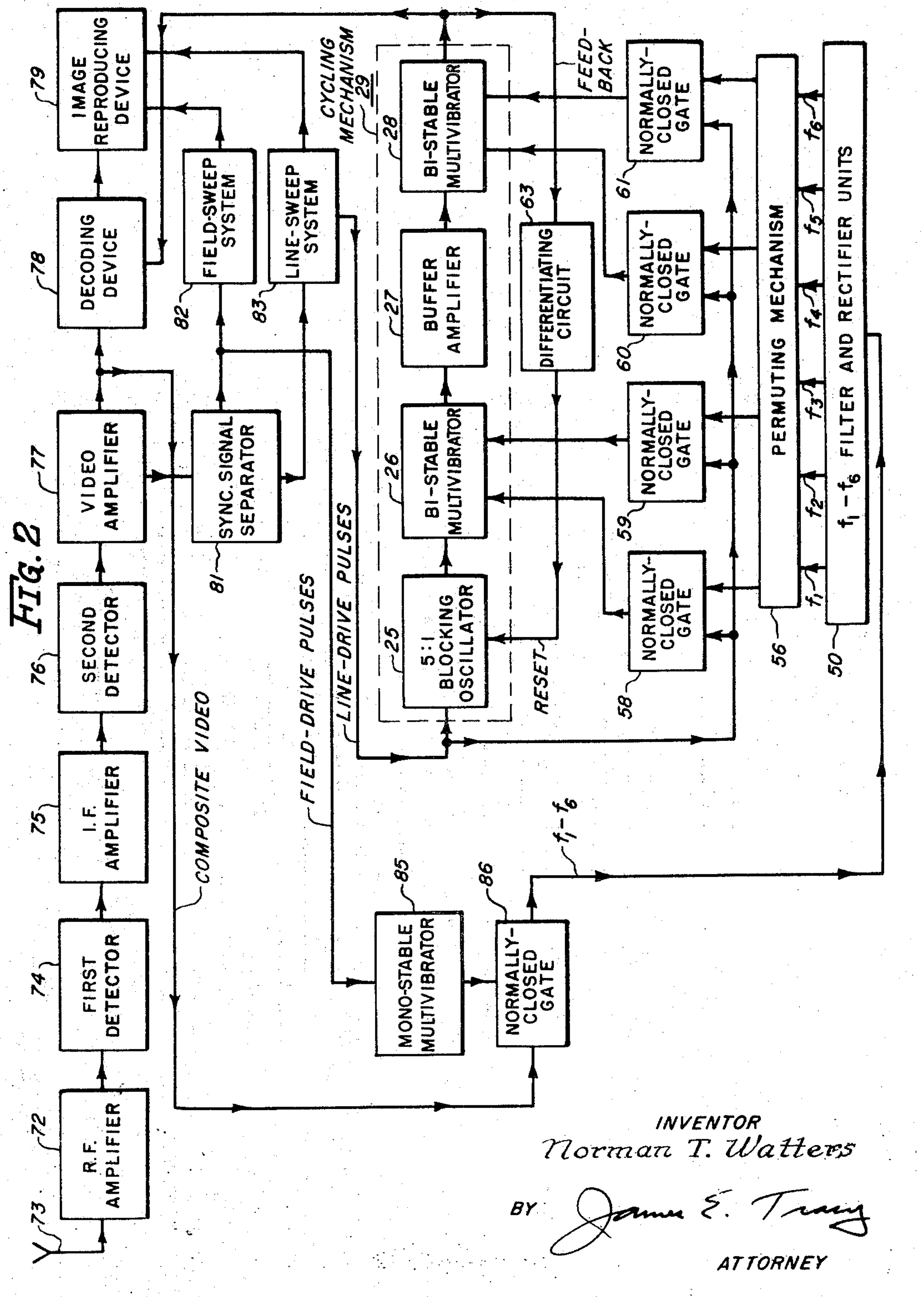
FIGURE 2 is a schematic representation of a subscription television receiver constructed to operate in conjunction with the transmitter of FIGURE 1, and represents another embodiment of the invention; and, FIGURE 3 illustrates a portion of both the transmitter and receiver of FIGURES 1 and 2, respectively, modified in accordance with still another embodiment of the invention.

The receiver of FIGURE 2 is constructed in accordance with the invention to decode especially the coded television signal developed in the transmitter of FIGURE 1. A radio frequency amplifier 72 has its input terminals connected to an antenna 73 and its output circuit connected to a first detector 74, which is connected in turn through an intermediate-frequency amplifier 75 to a second detector 76. This detector is coupled through a video amplifier 77 and an encoding device or decoder 78 to the input terminals of an image reproducing device or picture tube 79. Encoding or decoding device 78 may be identical in construction to encoding device 11 in the transmitter except that it is controlled to operate in complementary fashion in order to effectively compensate for variations in the timing of the video and synchronizing components of the received television signal. Specifically, when a delay is introduced at the transmitter between the occurrence of a radiated line-drive pulse and the video information occurring during the immediately succeeding line-trace interval, that video signal is translated through decoding device 78 with no delay, whereas when no delay is introduced at the transmitter a delay is imparted to the video signal in decoder device 78. Video amplifier 77 is also coupled to a synchronizing-signal separator 81 which is connected to the usual field-sweep system 82 and line-sweep system 83 connected in turn to the deflection elements (not shown) associated with reproducing device 79.

In order to facilitate the separation of the code signal bursts or components from the composite television signal, a mono-stable multivibrator 85 is connected to separator 81 to receive field-drive pulses therefrom and the output of the multivibrator is coupled to one input of a normally-closed gate 86, another input of which is coupled to the output of amplifier 77 to receive the still-coded composite video signal. The output of gate 86 is connected to a series of filter and rectifier units, once again illustrated for convenience as a single block 50. The remaining circuitry in FIGURE 2 is identical in construction and arrangement with the correspondingly numbered units in the transmitter of FIGURE 1. The only difference is that while the blocking oscillator 25 in the transmitter receives line-drive pulses from the synchronizing-signal generator, oscillator 25 in receiver of FIGURE 2 receives line-drive pulses from line-sweep system 83.

Turning now to the operation of the described receiver, the coded television signal is intercepted by antenna 73, amplified in radio-frequency amplifier 72 and heterodyned to the selected intermediate frequency of the receiver in first detector 74. The resulting intermediate-frequency signal is amplified in intermediate-frequency amplifier 75 and detected in second detector 76 to produce a coded composite video signal which is then amplified in video amplifier 77 and translated through encoding device 78 to the input electrodes of image reproducer 79 to control the intensity of the cathode ray beam in that reproducer in conventional fashion. The synchronizing components are separated in separator 81 and utilized to control the sweep functions in the customary manner.

Mono-stable multivibrator 85 responds to field-drive pulses to produce gating pulses each having a duration sufficient to embrace the time interval in which the code signal components appear during each field-retrace interval, and thus those components are gated in by gate 86 for application to the filter and rectifier unit 50. Decoding at the receiver is accomplished in the identical manner explained hereinbefore in connection with the coding operation at the transmitter, assuming that permutation mechanism 56 in the receiver is adjusted to the same setting as that employed for mechanism 56 in the transmitter.

Figure 3:
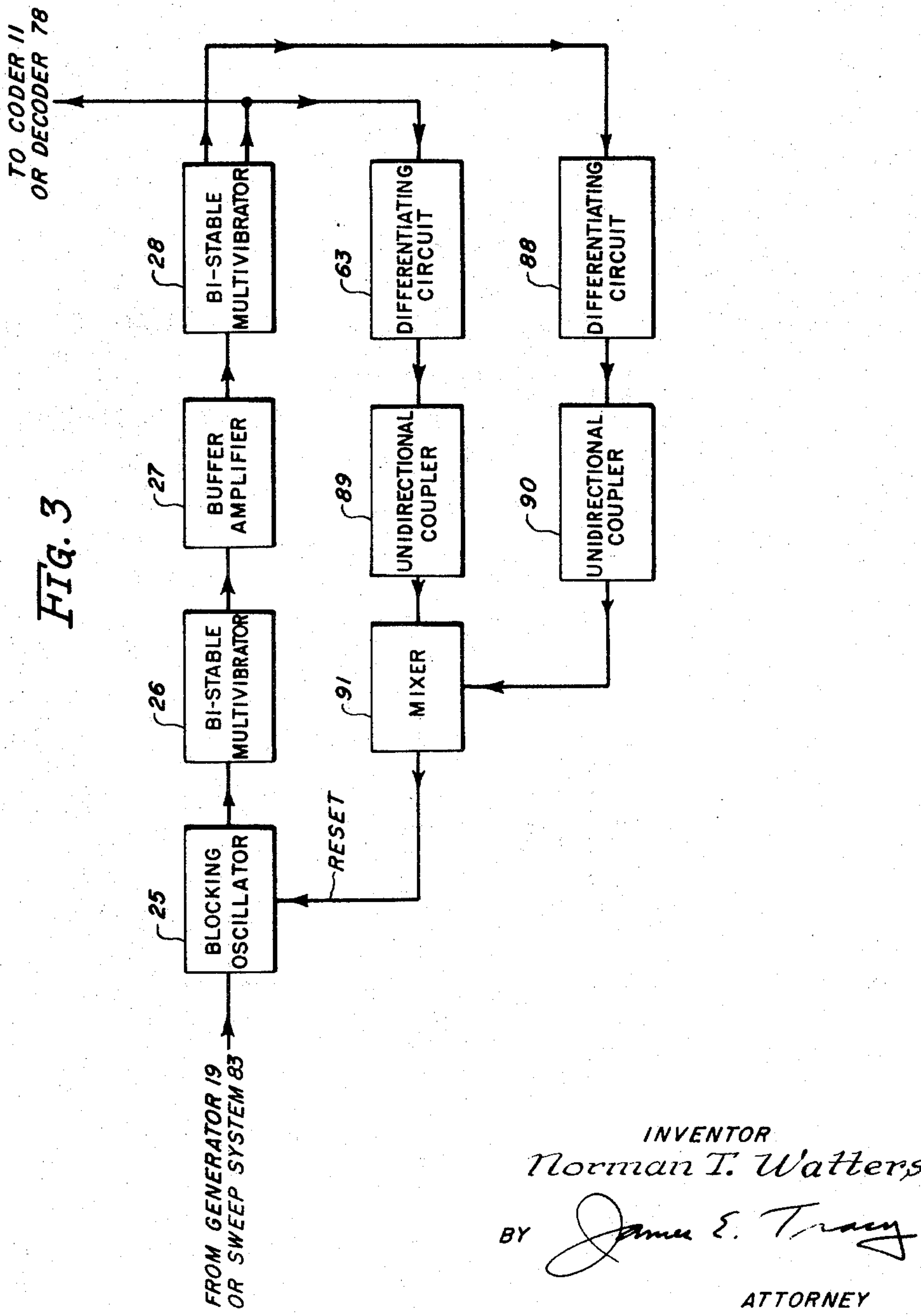

As mentioned before, with the feedback circuit including differentiator 63, resetting of blocking oscillator 25 occurs in response to certain characteristic variations only of the control signal, namely, in response to either the positive or negative going excursions of the control signal. With the embodiment of the invention illustrated in FIGURE 3, resetting of the oscillator is accomplished in response to each amplitude variation of the control signal.

Bi-stable multivibrator 28 provides, of course, two similar output signals, one merely being 180° out of phase with respect to the other. In the embodiments of FIGURES 1 and 2 only one of those output signals is used. In order to reset blocking oscillator 25 each time multivibrator 28 changes or assumes a different operating condition, it is convenient to also employ the out-of-phase output signal from multivibrator 28 in the manner illustrated in the embodiment of FIGURE 3. There, differentiating circuit 63 is connected to one output of unit 28 in the same fashion as illustrated in FIGURES 1 and 2. In addition, the other output of multivibrator 28, from which the opposite phase control signal may be derived, is coupled to another differentiating circuit 88. The outputs of differentiators 63 and 88 are connected respectively through a pair of unidirectional couplers 89, 90 to two different inputs of a mixer 91, the output of which is connected to the reset input of blocking oscillator 25. Assume now that oscillator 25 resets only in response to positive differentiated pulses, in which case couplers 89 and 90 must be constructed to pass positive pulses only. When the control signal applied to unit 63 executes a positive going amplitude excursion an appropriate positive spike is developed in the output of differentiating circuit 63 and is translated through coupler 89 and mixer 91 in order to reset the oscillator. On the other hand, when that same control signal undergoes a negative going amplitude excursion at the input of differentiating circuit 63, that excursion will take the form of a positive going change in the input signal to differentiating circuit 88 and thus an appropriate positive differentiated pulse is developed in the output of differentiator 88 and passed on through units 90 and 91 to realize resetting of oscillator 25. Thus, the oscillator is reset each time the control signal used for encoding undergoes an amplitude variation.

The invention provides, therefore, a multi-step cycling mechanism for controlling an encoding function, which mechanism is cyclically actuated to advance from one step to the next in a predetermined periodic repeating sequence. A feedback circuit is coupled from one to another portion of the cycling mechanism for resetting at least the other portion to a predetermined reference condition each time the mechanism advances to a predetermined one of its operating steps.

While particular embodiments of the invention have been shown and described, modifications may be made, and it is intended in the appended claims to cover all such modifications as may fall within the true spirit and scope of the invention.

I claim:

1. A secrecy communication system comprising: an encoding device actuable to vary the operating mode of said system; a multi-step cycling mechanism coupled to said encoding device and responsive to a series of applied pulses for advancing from one step to the next in a predetermined periodic repeating sequence to effect actuation of said encoding device; means for applying a series of drive pulses to said mechanism; means coupled to said cycling mechanism for altering said predetermined sequence of operating steps from time to time in accordance with a secret code schedule; and a feedback circuit coupled from the output of said cycling mechanism to a portion of said cycling mechanism for resetting at least said portion to a predetermined reference condition each time said mechanism advances to a predetermined one of its operating steps.

2. A secrecy communication system comprising: an encoding device actuable to vary the operating mode of said system; a multi-step cycling mechanism coupled to said encoding device and responsive to a series of applied pulses for advancing from one step to the next in a predetermined periodic repeating sequence to effect actuation of said encoding device; means for applying a series of drive pulses to said mechanism; means coupled to said cycling mechanism for altering said predetermined sequence of operating steps from time to time in accordance with a secret code schedule; and a feedback circuit, including a differentiator, coupled from the output of said cycling mechanism to a portion of said cycling mechanism for resetting at least said portion to a predetermined reference condition each time said mechanism advances to a predetermined one of its operating steps.

3. A secrecy communication system comprising: an encoding device actuable to vary the operating mode of said system; a multi-step cycling mechanism coupled to said encoding device and responsive to a series of applied pulses for advancing from one step to the next in a predetermined periodic repeating sequence to develop a rectangular shaped control signal for effecting actuation of said encoding device; means for applying a series of drive pulses to said mechanism; means coupled to said cycling mechanism for altering said predetermined sequence of operating steps from time to time in accordance with a secret code schedule; and a feedback circuit coupled from the output of said cycling mechanism to a portion of said cycling mechanism for resetting at least said portion to a predetermined reference condition responsive to certain amplitude excursions of said control signal.

4. A secrecy communication system comprising: an encoding device actuable to vary the operating mode of said system; a multi-step cycling mechanism coupled to said encoding device and responsive to a series of applied pulses for advancing from one step to the next in a predetermined periodic repeating sequence to develop a rectangular shaped control signal for effecting actuation of said encoding device; means for applying a series of drive pulses to said mechanism; means coupled to said cycling mechanism for altering said predetermined sequence of operating steps from time to time in accordance with a secret code schedule; and a feedback circuit coupled from the output of said cycling mechanism to a portion of said cycling mechanism for resetting at least said portion to a predetermined reference condition responsive to each amplitude excursion of said control signal.

5. A secrecy communication system comprising: an encoding device actuable to vary the operating mode of said system; a multi-step cycling mechanism the output of which is coupled to said encoding device for effecting actuation thereof; means for cyclically operating said mechanism to advance said mechanism from one step to the next in a predetermined periodic repeating sequence; means coupled to said cycling mechanism for altering said predetermined sequence of operating steps from time to time in accordance with a secret code schedule; and a feedback circuit coupled from the output of said cycling mechanism to a portion of said cycling mechanism for resetting at least said portion to a predetermined reference condition each time said mechanism advances to a predetermined one of its operating steps.

6. A secrecy communication system comprising: an encoding device actuable to vary the operating mode of said system; a pulse-actuated, multi-step cycling mechanism the output of which is coupled to said encoding device for effecting actuation thereof; a pulse-signal source coupled to said cycling mechanism for applying thereto a series of periodically recurring pulses to advance said mechanism from one step to the next in a predetermined periodic repeating sequence to execute each cycle of operation; means, including a source of code components having a random characteristic, coupled to said cycling mechanism for altering said predetermined sequence of operating steps from time to time in accordance with a secret code schedule determined at least in part by said random characteristic; and a feedback circuit coupled from the output of said cycling mechanism to a portion of said cycling mechanism for resetting at least said portion to a predetermined reference condition each time said mechanism advances to a predetermined one of its operating steps.

7. A secrecy communication system comprising: an encoding device actuable to vary the operating mode of said system; a cycling mechanism having a plurality of operating conditions; means for cyclically actuating said mechanism between its aforesaid operating conditions to develop a control signal having a characteristic that varies periodically only after predetermined discrete time intervals; means for disrupting the cyclic operation of said cycling mechanism from time to time in accordance with a secret code schedule to vary the phase of said control signal as between a plurality of possible phase conditions; means for utilizing said control signal to actuate said encoding device; and a feedback circuit coupled from the output of said cycling mechanism to a portion of said cycling mechanism for resetting at least said portion to a predetermined reference condition responsive to certain characteristic variations of said control signal.

8. A secrecy communication system comprising: an encoding device actuable to vary the operating mode of said system; a cycling mechanism, including a chain of a plurality cascade-connected, multi-condition counting devices collectively having a sequence of operating steps, for effecting actuation of said encoding device; means for cyclically actuating said counting chain through its sequence of operating steps; means for disrupting the cyclic operation of at least one of said counting devices; and a feedback circuit coupled from the output of said cycling mechanism to a portion of said cycling mechanism for disrupting the cyclic operation of at least one other one of said counting devices.

9. A secrecy communication system comprising: an encoding device actuable to vary the operating mode of said system; a cycling mechanism for effecting actuation of said encoding device and comprising a plurality of cascade-connected counting stages collectively constituting a counting chain; means coupled to the first of said stages in said chain for cyclically operating said chain through a sequence of steps to effect actuation of said cycling mechanism in a predetermined periodic repeating sequence; means coupled to one of said stages subsequent to said first stage for interrupting said periodic sequence from time to time in accordance with a secret code schedule; and a feedback circuit coupled from the last of said stages to said first stage for resetting said first stage to a predetermined reference condition each time said counting chain advances to a predetermined one of its operating steps.

References Cited in the file of this patent

UNITED STATES PATENTS 2,883,449 Eilers ---------------- Apr. 21, 1959

FOREIGN PATENTS 213,991 Australia -------------- Mar. 20, 1958
215,459 Australia -------------- June 13, 1958